United States Patent
Motley, III et al.

(10) Patent No.: US 9,507,983 B2
(45) Date of Patent: *Nov. 29, 2016

(54) METHODS AND SYSTEMS FOR GPS-ENABLED BAGGAGE TAGS

(71) Applicant: PINGER TECHNOLOGIES, INC., Santa Barbara, CA (US)

(72) Inventors: Cleveland A. Motley, III, Santa Barbara, CA (US); Enrique A. Salgado, Santa Barbara, CA (US); Roland F. Bryan, Santa Barbara, CA (US)

(73) Assignee: PINGER TECHNOLOGIES, INC., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/605,983

(22) Filed: Jan. 26, 2015

(65) Prior Publication Data

US 2015/0186699 A1 Jul. 2, 2015

Related U.S. Application Data

(63) Continuation of application No. 13/747,174, filed on Jan. 22, 2013, now Pat. No. 9,129,167.

(60) Provisional application No. 61/632,250, filed on Jan. 21, 2012.

(51) Int. Cl.
*H04Q 5/22* (2006.01)
*G06K 7/10* (2006.01)
(Continued)

(52) U.S. Cl.
CPC ....... *G06K 7/10366* (2013.01); *G06K 7/10009* (2013.01); *G06K 19/0717* (2013.01); *B64F 1/368* (2013.01); *G09F 2003/0254* (2013.01)

(58) Field of Classification Search
CPC .... G06Q 10/08; G07B 15/00; G06K 7/0008; G06K 19/00723
USPC ........................................................ 340/10.51
See application file for complete search history.

(56) References Cited

U.S. PATENT DOCUMENTS 7,427,918 B2   9/2008  Fano
7,535,358 B2 * 5/2009  Crider et al. ............. 340/572.1
(Continued)

OTHER PUBLICATIONS

U.S. Appl. No. 13/747,174 Non-Final Office Action mailed Feb. 24, 2015.

(Continued)

*Primary Examiner* — Vernal Brown
(74) *Attorney, Agent, or Firm* — Wilson, Sonsini, Goodrich & Rosati (57) ABSTRACT

An electronic baggage tag is self-reliant and self-regulating and provides the underlying foundation for a baggage tracking and management system, the center of which operates one or more tag service provider servers. The tag is attached to a baggage and is loaded with various data, including passenger itinerary, GPS data, and journey profile data. The tag has sensors, such for detecting different vibrations, electro-magnetic sensor, GPS, and others. As the baggage to which the tag is attached goes on its journey, the sensors detect stimuli and ascertain where in the journey the baggage is and use itinerary and other data to determine where the baggage should be. The tag service provider server communicates with the tag at various stages in the journey, providing up-to-date itinerary data to the tag. The tag automatically shuts off to be compliant with government regulations for devices in flight.

16 Claims, 10 Drawing Sheets

(51) Int. Cl.
  *G06K 19/07* (2006.01)
  *B64F 1/36* (2006.01)
  *G09F 3/02* (2006.01)

(56) References Cited

U.S. PATENT DOCUMENTS

| | | | |
|---|---|---|---|
| 7,791,455 B1 | 9/2010 | MacLean, III et al. | |
| 8,150,844 B2 | 4/2012 | Redstone et al. | |
| 9,317,727 B2 * | 4/2016 | Motley, III | G06K 7/10366 |
| 9,317,728 B2 * | 4/2016 | Motley, III | G06K 7/10366 |
| 2002/0113707 A1 * | 8/2002 | Grunes et al. | 340/572.1 |
| 2003/0120745 A1 * | 6/2003 | Katagishi et al. | 709/217 |
| 2003/0225612 A1 | 12/2003 | DeSimone et al. | |
| 2006/0097046 A1 * | 5/2006 | Baru Fassio et al. | 235/385 |
| 2006/0118732 A1 | 6/2006 | Blanton | |
| 2007/0222674 A1 * | 9/2007 | Tan et al. | 342/357.02 |
| 2008/0150691 A1 * | 6/2008 | Knadle et al. | 340/10.1 |
| 2008/0303669 A1 | 12/2008 | Lazo | |
| 2012/0329486 A1 * | 12/2012 | Gits et al. | 455/466 |
| 2013/0241712 A1 | 9/2013 | Motley et al. | |

OTHER PUBLICATIONS

U.S. Appl. No. 13/747,174 Non-Final Office Action mailed Sep. 30, 2014.
U.S. Appl. No. 14/605,963, filed Jan. 26, 2015, Motley et al.
U.S. Appl. No. 14/605,967, filed Jan. 26, 2015, Motley et al.
U.S. Appl. No. 14/605,972, filed Jan. 26, 2015, Motley et al.
U.S. Appl. No. 14/605,979, filed Jan. 26, 2015, Motley et al.
U.S. Appl. No. 14/605,972 Office Action dated Jul. 8, 2015.
U.S. Appl. No. 14/605,979 Office Action dated Jun. 23, 2015.
U.S. Appl. No. 13/747,174 Office Action dated May 4, 2015.
U.S. Appl. No. 14/605,963 Office Action dated May 11, 2015.
U.S. Appl. No. 14/605,967 Office Action dated May 7, 2015.
U.S. Appl. No. 14/605,963 Office Action dated Oct. 16, 2015.
U.S. Appl. No. 14/605,967 Office Action dated Dec. 3, 2015.
U.S. Appl. No. 14/605,972 Office Action dated Nov. 25, 2015.

* cited by examiner

METHODS AND SYSTEMS FOR GPS-ENABLED BAGGAGE TAGS

CROSS-REFERENCE TO RELATED APPLICATIONS

This application is a continuation of U.S. patent application Ser. No. 13/747,174, filed Jan. 22, 2013, which claims the benefit under 35 U.S.C. Section 119 of U.S. Provisional Patent Application No. 61/632,250, titled "METHODS AND SYSTEMS FOR GPS-ENABLED BAGGAGE TAGS," filed Jan. 21, 2012, which is hereby incorporated by reference in its entirety.

TECHNICAL FIELD

The present invention relates generally to software and hardware for self-regulating, electronic tags that can be attached to an item for managing and tracking the item while in transit. More specifically, it relates to software for implementing the self-regulating tag for tracking and managing passenger luggage on a commercial airline where the tag operates in compliance with FAA, FCC, TSA, and other agency regulations.

BACKGROUND OF THE INVENTION

Presently, the commercial airline industry uses paper baggage tags but has plans to implement electronic baggage tags. Generally, these are tags that are attached to passenger check-in baggage (or cargo) and are used in place of conventional adhesive, paper tags containing barcodes, airport codes, and other information that are attached to passenger baggage by an airline agent at check-in. These conventional tags are then cut or torn off by the passenger at the end of the journey.

As is known in the art, barcode technology is the world's dominant track-and-trace technology. Although relatively inexpensive to print and track, barcodes require direct line-of-sight and undamaged tags in order to be scanned. According to experts in the airline industry, barcode scanners fail to accurately read 15% to 30% of barcoded baggage tags.

As a result of the drawbacks of reading barcodes in the airline industry, some airlines have started using baggage tags embedded with RFID chips. Some airports have installed an RFID system throughout the airport or select terminals. This technology provides a higher probability of reading baggage tags automatically and more accurately than paper barcode tags, but RFID tags are not more physically robust than barcode tags and both are subject to being unreadable due to damage from baggage handling and wear and tear from being in transit.

As noted, barcode-readers require line-of-sight visual scanning of the barcode. RFID technology requires 10 to 15-foot proximity for RFID equipment to read data embedded on RFID chipsets. It would be preferable to have a technology that uses technology that enables airlines and passengers to track their baggage essentially anytime and anywhere throughout the world, without the need for additional infrastructure and that is in compliance with government regulations.

SUMMARY OF THE INVENTION

Embodiments of the present invention include an electronic baggage tag that is self-reliant and self-regulating that provides the underlying foundation for a baggage tracking and management system, the center of which operates one or more tag service provider servers. The tag is attached to a baggage or other item in transit, such as cargo, and is loaded with various data, including, but not limited to a passenger itinerary, GPS data, and, in some embodiments, journey profile data. The tag also has various sensors, such as sensors for detecting different types of vibrations, electro-magnetic sensor, compass, light sensor, GPS chipset and antenna, and others. As the baggage to which the tag is attached goes on its journey, the sensors detect stimuli and ascertain where in the journey the baggage is and use itinerary and other data to determine where the baggage should be. The tag service provider server communicates with the tag at various stages in the journey, one of its primary functions being providing up-to-date itinerary data to the tag.

One of the important self-regulating features of the tag is its ability to turn off power and be compliant with government regulations before being conveyed on an aircraft, such as disabling GPS and cellular communications. It does this without having to receive instructions or otherwise communicate with the server or any other external component. The tag is then able to turn back on when the flight is over and GPS and cellular communications are allowed, again without communication with a server. Another feature is the tag's ability to determine when there is a discrepancy between where the tag actually is (which it can determine using its sensors and time) and where it should be based on its itinerary, which is updated by the server. Notice of this discrepancy may be indicated on the tag itself and be transmitted as alerts to airline personnel and the passenger. In this manner, the tag functions as the basis for an electronic baggage tracking and management system. The tag itself contains all the intelligence needed to be self-reliant and self-regulating. Through communication with the server, the tag can also benefit from historical and learned data from previous journeys, further adding to its intelligence over time.

BRIEF DESCRIPTION OF THE DRAWINGS

The invention and the advantages thereof may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION OF THE INVENTION

One of the important aspects of the present invention is the ability of the baggage tag to comply with FAA, FCC, and TSA regulations while concurrently being able to monitor and manage its own operations (self-regulate) without having to rely on external components or servers for instructions, power, directions, etc. As described below, although the baggage tag of the present invention does communicate with an external component, such as a server operated by a tag system service provider, such as Connxys Technology, Inc. of Santa Barbara, Calif., this communication is not critical to the tag's operation. This communication is primarily for the tag to obtain itinerary updates and for the server to send specific learned and/or historical information about the journey that the tag is to undertake. This is data that the server has learned from other tags that have gone on the same and similar journeys.

Another important aspect of the present invention, closely related to complying with government regulations, is the tag's ability to know where it is (self-track) by using a combination of sensing devices to gather data about its location and the itinerary for the baggage, a real-time clock, and external resources, including databases described below. This combination enables the tag to compare its actual position with its expected or predicted position. This allows the tag to essentially self-regulate, including making the critical determination to disable certain functions (go into "sleep" mode) at the right time and re-engage those functions ("wake up"), all without communication with external components. As will be seen from the description below, a persistent theme or feature of the tag of the present invention is that the tag itself contains all the necessary intelligence to self-regulate.

Figure 1:
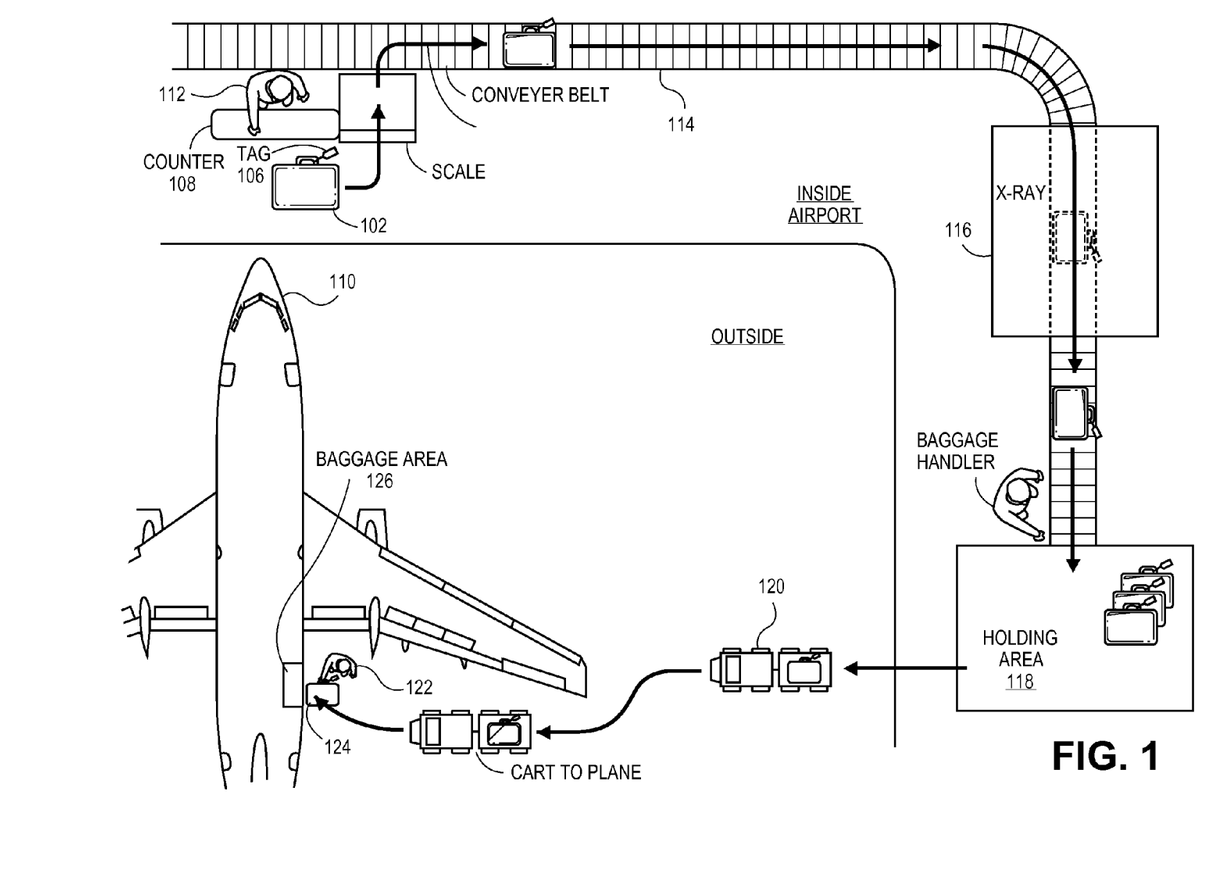
FIG. 1 is an illustration showing various stages that a bag goes through before being loaded onto a plane in accordance with one embodiment.

The purpose of FIG. 1 is to provide an overview of various stages that a baggage 102 goes through before being loaded onto a plane. It shows one example of a path 104 (solid arrow) that tag 106 may take from check-in counter 108 to being loaded onto a plane 110. There are stages that occur after baggage 102 is loaded onto plane 110, when it is unloaded from plane 110, when it continues on another leg of a journey, or is picked up by the passenger which are not shown in FIG. 1.

Tag 106 is attached to baggage 102. The tag 106 is activated or powered on. An airline agent 112 scans the bar code on the tag 106 to obtain the tag serial number. This serial number is associated with passenger data and itinerary that the agent 112 has displayed or active on the airline computer at counter 108. The passenger itinerary data is downloaded to the tag 106 upon the agent entering the appropriate commands at the counter terminal either wirelessly or through a wired connection with the tag 106. Concurrently, passenger data and passenger itinerary data are uploaded to a tag service provider server. This server (not shown in FIG. 1) now has a temporary record containing passenger data and passenger itinerary data. In one embodiment, as noted, passenger itinerary data is downloaded onto the tag 106. As described below, other non-passenger data are also downloaded onto tag 106, for example, data that relates to the itinerary (also referred to as "journey") such as journey profiles, vibration profiles, GPS locations of airports and specific gates, ramps, counters, and the like within airports from the service provider server. As described below, vibration profiles may be described as phrases strung or stitched together to make a sentence that the tag can understand and read to determine where it is in the journey.

The baggage 102 is placed on a conveyor belt 114 by the airline agent. In other scenarios, the baggage may be carried by the passenger to a holding area where an airline or government agent who then handles the bag. In either case, the bag 102 travels on a conveyor belt 114 where it senses a certain type of vibration using one or more of its sensors. At one point it enters an x-ray unit 116 where the tag 106 senses other stimuli, such as electro-magnetic signals, darkness, a somewhat different vibration, and the like. In another embodiment, the tag may go through an x-ray unit 116 earlier, before being placed on a conveyor belt 114.

After the x-ray unit 116, the baggage 102 continues on a conveyor belt 114 and reaches a holding area 118. A baggage handler may pick up the baggage 102 and place it in holding area 118 where it may be motionless for a certain time. Again, sensors in the tag 106 detect abrupt movement (e.g., being lifted, put down, dropped, etc.) and lack of motion (stillness), and other stimuli, such as change in light, temperature, lack of vibration, as well as the current time, time elapsed since the tag 106 was powered on, and the like. In another scenario, the bag 102 may be picked up off the conveyor belt 114 and immediately placed on a baggage cart 120. Sensors in the tag are able to detect this sequence of activities and motions.

Once on a baggage cart 120, the baggage 102 is presumably outside for the first time since the tag was attached to it. At this stage the tag may detect a different type of vibration from being driven in cart 120, a change in light, temperature, time indicators, etc. The tag 106 is now in a location (i.e., open sky above) where it can obtain an accurate GPS reading. The baggage cart 120 takes the baggage towards plane 110 and stops at the appropriate location. At this stage, the baggage 102 is about to be loaded onto plane 110. The tag 106 may get a GPS reading and transmit this to the tag service provider server. It should be noted that the tag may communicate with the server a number of times before this point as well, or possibly not have communication at all. In addition to transmitting GPS data, the tag 106 may also receive any updates to the itinerary from the service provider server, such as flight delays, cancellations, gate changes, and the like. As described in greater detail below, if there is a discrepancy, a light or other indicator on the tag may flash or make a sound. The tag may get such updates at any time in its journey starting, in one embodiment, from the check-in counter 108. How a discrepancy is determined is an important aspect of the present invention and is described below. A baggage handler 122 picks up the bag 102 from the cart 120 and places it on a tram 124 that leads to the plane baggage storage area 126. Again, the abrupt movements experienced by the tag from being placed on tram 124, the vibrations from tram 124, changes in light, detection of certain types of signals from being close to the plane, and so on are all detected by the tag 106.

One critical function performed by tag 106 while it is either waiting to be placed on tram 124 (i.e., it is in proximity to plane 110), on tram 124, or soon after it is on plane 110 is transitioning to sleep mode. More specifically, it transitions to a mode that is compliant with government agency regulations, such as regulations promulgated by the FAA, TSA, and others. Generally, this means that the tag cannot perform any cellular or GPS-related activity and must be considered turned off as the term is generally interpreted. As described below, in one embodiment, it may still have power and the sensors may still be functioning, so it is able to detect vibrations, sounds, RF signals, light, movements, and so on. Certain stimuli from these sensors are used by the tag to transition back to its normal operating state when the baggage 102 is being unloaded from plane 110.

The operation of transitioning into regulation-compliant mode during conveyance on the plane is one component of the self-regulating aspect of the tag. It is also important to note that tag 106, throughout stages in its journey, communicates with the tag service provider server at various times, such as at validation points and inflection points, but is not reliant on the server to operate and self-regulate, and does not communicate with the server while aboard the aircraft. It uses the server primarily to get updates on the itinerary as well as for other functions. It may do this four, 10, or 30 times during a journey. The number of times it communicates with the server is not arbitrary but neither is it set or pre-determined to be a certain number for all journeys. A validation point may be described as a key point in a journey where the tag service provider expects the tag to be at a certain time in the journey and the tag confirms that it is, in fact, at this point or location. For example, the x-ray machine or the loading pier in the baggage handling area may be typical validation points. Another may be on the baggage cart while waiting to be loaded onto the plane. An inflection point may be described as another important point in the journey, such as at the check-in counter where the journey starts or off loading at the destination ramp. A stage in a journey may be described in different ways. One is the period or portion of a journey between inflection points.

As noted, the tag remains in deep sleep mode while on the plane and continues on its (i.e., the baggage's) journey, which may include more flights or termination indicated by a passenger picking up the bag off the baggage carousel. In either scenario, the tag detects stimuli in the same manner as described above, communicates with the tag service provider server as needed, and reports/indicates discrepancies when they occur.

Figure 2:
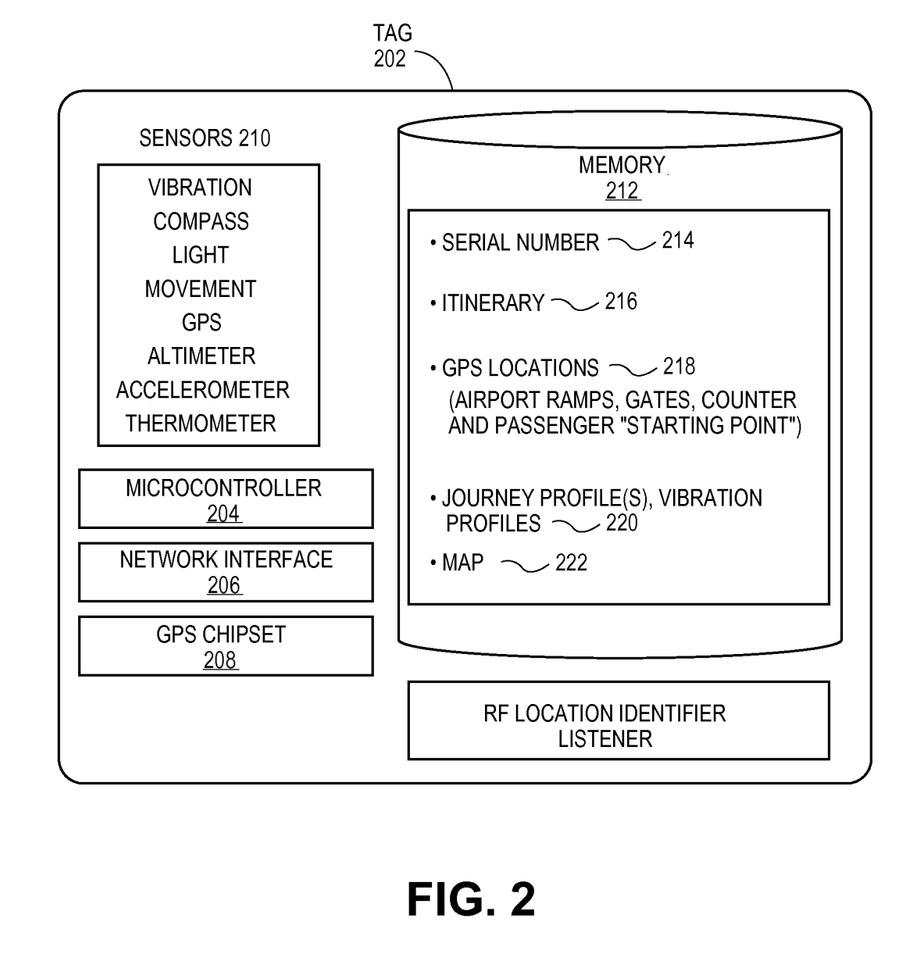
FIG. 2 is a block diagram of a tag in accordance with one embodiment.

FIG. 2 is a block diagram of a tag 202 in accordance with one embodiment. Tag 202 has numerous standard or conventional hardware components, a few of which are shown in FIG. 2. They include a microcontroller 204 (with RAM), a network interface 206, SIM card, embedded antenna, GPS chipset or module and antenna 208, various LED indicators, PB switch, a bus, mini USB port, photo cell, battery, cellular communication components, antenna, and others. Of course, tag 202 also has various sensors 210. A tag may have some of the sensors shown, all of them, or additional sensors. The sensors are conventional and known to persons skilled in the art. These include sensors for detecting a range of vibrations and vibration types, sensors for detecting movement (e.g., continuous, abrupt, rolling, stillness, etc.), a 3D compass, a light sensor, a GPS sensor, altimeter, thermometer, accelerometer, magnetometer, and others. Different versions or models of tag 202 may have different groups or suites of sensors 210. For example, if tag 202 is nearly always expected to take one of four or five known journeys and none of them require detecting certain stimuli, such as light or temperature, the tag need not include those sensors. Tag 202 may use as many sensors as possible to understand a particular journey. It may use fewer sensors, but generally the more information it can obtain about the journey, the better it will be at making its own decisions.

Tag 202 stores several data items in memory, examples of which are shown in tag memory 212. All tags have a serial number 214 and may also store other data identifying itself. As noted above, when the tag is turned on, a passenger itinerary 216 is downloaded or transmitted and stored on the tag 202. A standard or conventional format may be used to store passenger itinerary data 216. What data comprises a typical itinerary is determined by airline industry standards. In another embodiment, a passenger record, containing general information on the passenger, may also be stored on the tag.

Another category of stored data is GPS location data 218. This may include the GPS positions of various spots within airports that are part of the passenger itinerary. These may include gates, ramps, holding areas, check-in counters, and any other locations that are relevant to the itinerary and that can be supplied by the tag service provider. For example, the GPS position data for every gate location of each airline at every airport. The GPS position of the passenger starting point may also be included. In most cases this will be the airline check-in counter.

One important aspect of the present invention is determining when there is a discrepancy between where the baggage should be at a certain time (its expected location) and where the baggage actually is at that time. One critical component in determining whether there is a discrepancy is the journey profile 220 which is comprised of, in one embodiment, distinct vibration profiles. The order of abrupt and continuous movement and stillness (i.e., no vibration) and the time between each of these comprises a journey profile. Given a specific itinerary, there is an expected sequence of vibrations. This sequence of vibrations make up one or more vibration profiles.

Figure 7A:
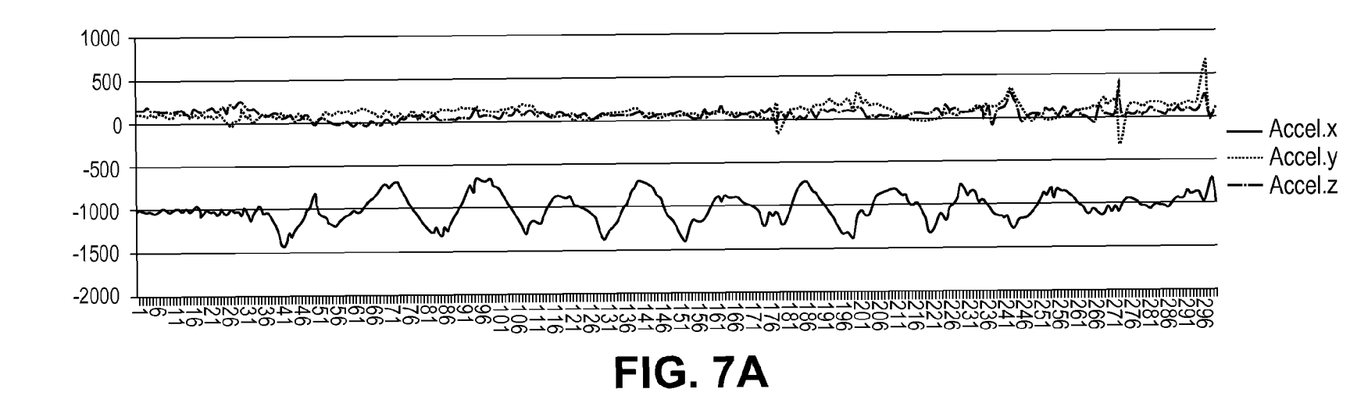
FIGS. 7A, 7B, and 7C shows sample vibration profiles.
Figure 7B:
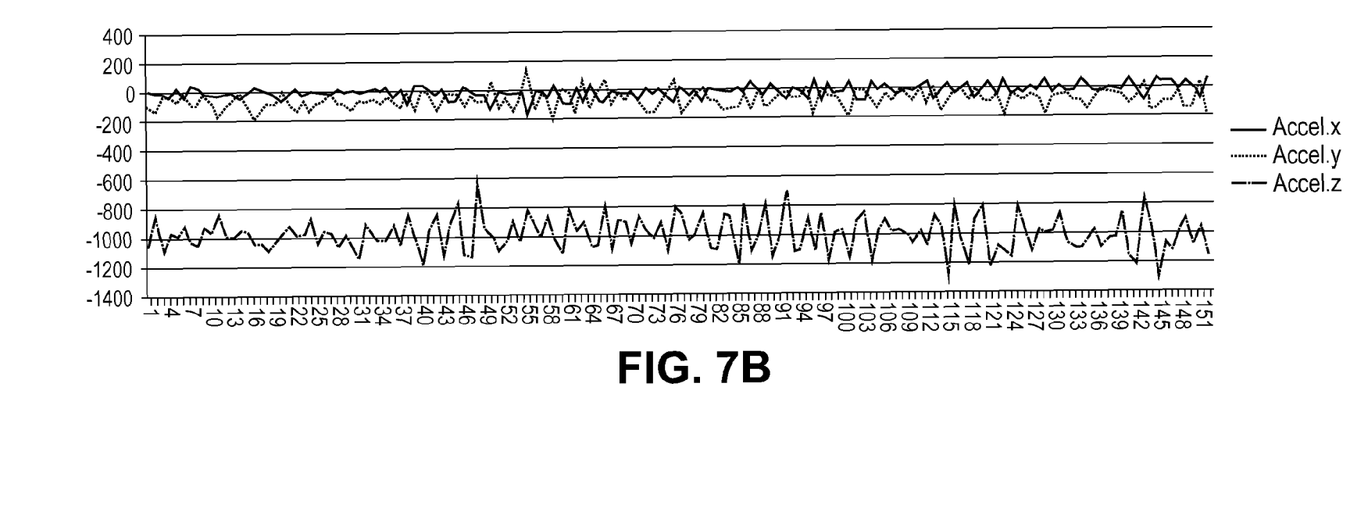
Figure 7C:
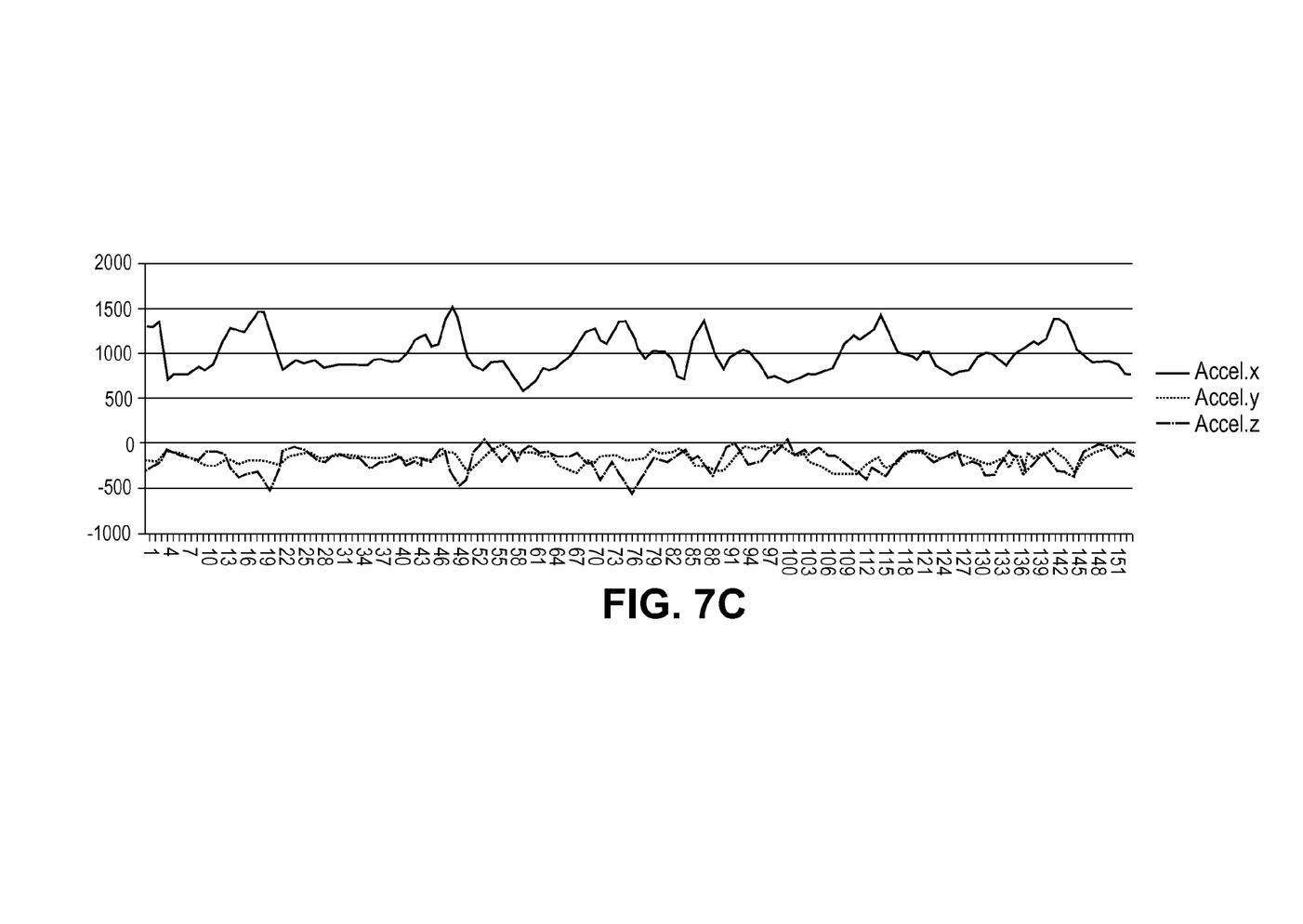

Examples of vibration profiles are provided in FIGS. 7A, 7B, and 7C. The graph in FIG. 7A shows a sample vibration profile from the baggage with the tag traveling on a conveyor belt. The graph in FIG. 7B shows a sample vibration profile from rolling the baggage with the tag on wheels. The graph in FIG. 7C shows a sample vibration profile from carrying the baggage.

These journey and vibration profiles are downloaded to the tag when powered on or during the journey and may be updated by the server as needed. The profile of a journey also includes the detection of light, temperature, and unique location identifiers transmitted by short-range RF signals, GPS locations and others that detect specific way points along a frequently travelled journey. Other types of data may include maps 222, times, x-ray, continuous movement, abrupt movement, stillness, temperature, detection of homing device (wireless), detection of cellular stations, detection within a perimeter of a GPS way point, and reception of a unique location identifier transmitted by a short range RF transmitter. Also included may be RF location identifier listeners 224, which can also be described as "beacon listeners."

It is important to note that the tag is provided with intelligence about the journey so that it can be self-reliant and self-aware. As described below, the tag service provider may learn about journeys over time and collect historical data on journeys that it can download to tags to make the tags more intelligent as the body of journey data grows, where historical journey data takes on the role of "learning data" as described below.

Figure 3:
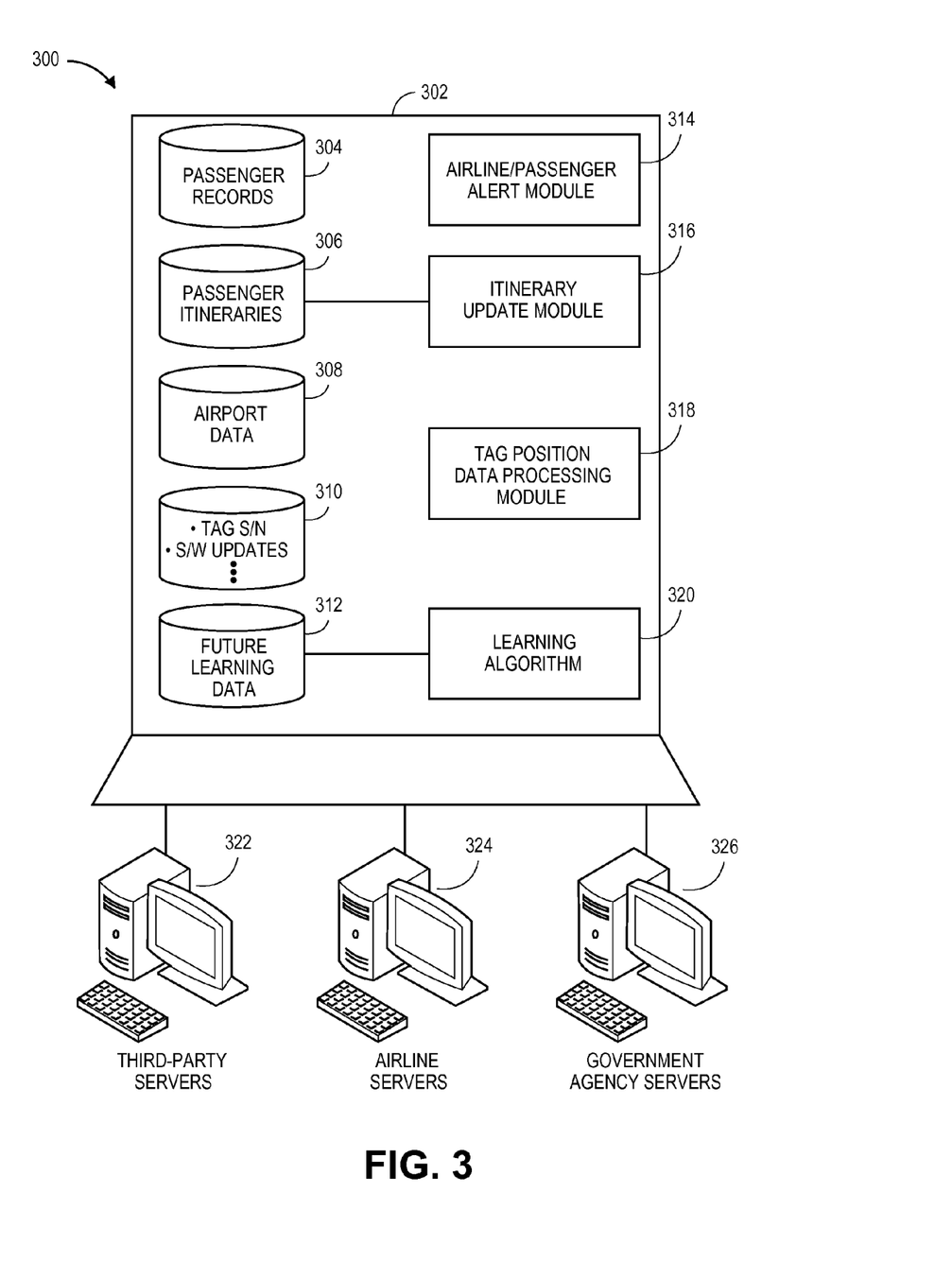
FIG. 3 is block diagram showing relevant data and software modules on a tag service provider server in accordance with one embodiment.

FIG. 3 is a block diagram showing relevant data and software modules on a tag service provider server in accordance with one embodiment. It also shows external sources of information from which the service provider may obtain data in order to implement and improve upon the baggage tracking and management system of the present invention. Conventional hardware components of a computing device are not shown (these items are described in FIGS. 7A and 7B). Tag service provider server 300 stores various types of data. Those relating to passengers include passenger records 304 which, in one embodiment, are temporary and are created when a tag is powered on and associated with a passenger, most typically at check-in time. A typical passenger record includes name, address, phone number, e-mail address, loyalty program identifier, and the like. Once a journey is completed and the tag is powered off, the temporary record for a passenger may be deleted from server 300 or it may be archived and retrieved for future use (e.g., frequent flyer passenger records may be kept).

Associated with a passenger record are passenger itineraries 306. These may also be temporary and are deleted when a tag has finished a journey. A sample itinerary table may include an itinerary ID, a user or passenger ID, an airline reservation number (assigned by the airline), reservation type, departure data and time, arrival date and time, number of stops, and so on. There may also be another itinerary table that is specific to flights. This table may have numerous types of data related to specific flights: flight ID, itinerary ID, airline ID, flight class, departure location (airport ID), departure date and time, flight number, arrival location (airport ID), arrival data and time, flight status, and the like.

Software modules that utilize records 304 and itineraries 306 are itinerary update module 316 and airline/passenger alert module 314. Update module 316 represents logic for obtaining updates to flights, such as delays, gate changes, cancellations, and so on from airline servers or third-party servers. It then makes the appropriate changes to passenger itineraries as needed. In this manner, any time a tag communicates with server 300, it will receive any updates to the itinerary. Alert module 314 represents logic for alerting a passenger or airline personnel of any discrepancies in the location of a tag, that is, if a tag (and by extension, baggage) is not where it is expected to be. For example, if a tag determines that there is a discrepancy, in addition to engaging its own distress indicators (e.g. LEDs), it may also communicate with server 300, if possible, and inform the server that it should send an alert, such as an e-mail or SMS message to the passenger and/or airline. Module 314 is responsible for distress signals and discrepancy messages. Contact information for the passenger may be obtained from passenger records 304. In other embodiments or in scaled-down versions of server 300, alert module 314 may not be present.

Airport data 308 contains GPS position data of specific spots within airports and various other airport-related data. For example, these spots may be gates, ramps, and check-in counters for multiple airlines at multiple airports, baggage carousels, baggage holding areas, and/or latitude and longitude data of the following: baggage check-in, planes, carousel, holding area, and others. This data may grow over time as tag service provider collects data on airports. Airport data 308 is used by a tag position data processing module 310. This module receives as input the GPS position of the tag and processes this data. In one embodiment, the data is stored with or compared to airport data 308. Tag service provider server also makes decisions with the data or the lack of data. The server reports discrepancies and stores data it has learned about the journey for future use. That is, the data may be used by subsequent tags that take the same journey (i.e., have the same itinerary).

Other data stored in server 300 include tag serial numbers, software updates, and the like. In one embodiment, vibration profiles of known journeys may also be stored. The number of these distinct vibration profiles will grow over time. The vibration profiles and the GPS data from a tag can be used by server 300 to determine whether the baggage is at an expected location. This discrepancy analysis may be done on the tag itself, as described in the embodiment above, or in an alternative embodiment, may be done on server 300 or on both server 300 and the tag.

Another category of data on server 300 may include future learning data, also referred to as historical data 312. This is data that the system has already seen or, in other words, data that represents what a tag has already experienced on a particular journey. This may include vibration profiles, wait times, sleep mode duration times, and other data that characterize a journey taken by a tag. A learning algorithm 314 accepts as input future learning data 312 and creates distinct vibration profiles, journey profiles, and other information that can be used to make the server and the tags more intelligent and, with respect to the tags, more self-reliant given that these profiles and information can all be pushed to the tags. For example, once a tag is loaded with an itinerary and the server receives the same, profiles that are relevant to that itinerary that have been developed from past experiences of other tags can be sent to the tag at the same time. Over time, this makes the tag better able to self-regulate, detect discrepancies more accurately, and operate in increasingly hostile environments (airports are already hostile environments and conditions for cellular, GPS, and other forms of communication are likely to grow more challenging).

In another embodiment, neural network algorithms may be used, such as support vector machines. These are able to take a combination of sensor data and more accurately determine the actions that are taking place and more accurately determine the tag's location.

All the data on server 300 may be supplemented by data from external sources. Tag service provider may arrange for communication with as many external servers as needed. The most prevalent external source may be airline servers 324 from which the service provider can access or receive airline updates on flights. Another source may be government agency servers 326, such as publicly-accessible FAA, TSA, and other agency servers which may also provide a wide range of data on flights, airports, airlines, and the like. Finally, any other third-party servers 322 operated by entities in the airline industry that provide data that may be useful to the tag service provider. These may include third-party servers that keep track of the location of planes throughout the world and expected arrival and departure flights. They may also keep track of gate numbers, etc. In other embodiment, the tag may be more independent and third party services may be contacted directly by the tag and become less reliant on the tag service provider server and other back-end servers.

Data from these external sources can be used to supplement any of the data stores described above or may be used to create new categories or types of data. In most cases, it is likely that the externally-sourced data will be used to learn real-time data on flight changes, delays, cancellations, gate changes, and other such data that directly affect passenger itineraries and, by extension, the intelligence needed by a tag to accurately determine a discrepancy. Another likely use of this data is to update or add to airport data, for example, the GPS locations of a particular airline's gates, ramps, check-in counters, and the like.

Figure 4:
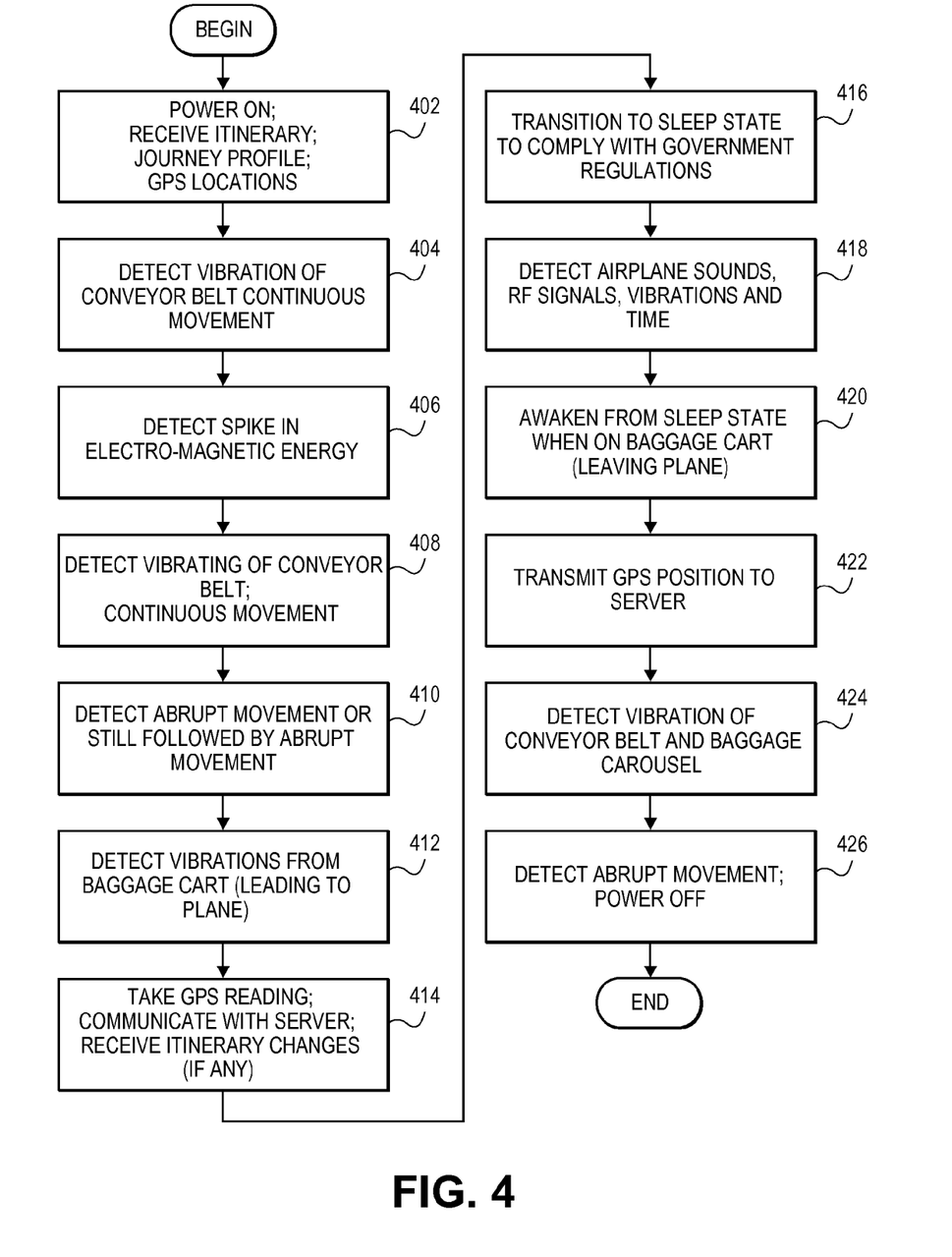
FIG. 4 is a flow diagram of operations and functions performed by a self-regulating electronic baggage tag in accordance with one embodiment.

FIG. 4 is a flow diagram of operations and functions performed by a self-regulating electronic baggage tag in accordance with one embodiment of the present invention. It illustrates one scenario out of many that a tag may experience. In this scenario the tag does not encounter any discrepancies and the itinerary is a one-leg trip. Showing logic for detecting a discrepancy is described below. The sample, illustrative steps shown in FIG. 4 are from the perspective of the tag. The tag may be obtained and attached to a baggage in a number of ways. The passenger may buy the tag so that it is her personal property and attaches it to the baggage at home or at the airport check-in counter. The passenger may obtain the tag from a kiosk at the airport where the tag is the property of the airline and the passenger is using it temporarily for her journey. The most likely way a passenger obtains a tag is by an airline agent at a check-in counter. Instead of an agent attaching a paper baggage tag to the baggage being checked in, as has been conventional practice for decades, the agent attaches an electronic baggage tag to each baggage being checked in. In each case, the tag has a unique serial number.

Regardless of how the tag is attached to the baggage or who does so, the process in FIG. 4 starts with the tag being powered on at step 402. The tag bar code is scanned by an agent at the check-in counter to obtain the tag's serial number. Presumably, the passenger's information and itinerary are on the agent's terminal. Software on the agent's computer links the tag serial number with the passenger's information and itinerary. The passenger itinerary is downloaded onto the tag, either via a wireless or wired connection at the counter. As described above, at the same time, the itinerary and passenger information are uploaded or transmitted and stored at the tag service provider server. The server transmits one or more journey and/or vibration profiles relevant to the itinerary to the tag. It may also transmit GPS locations relevant to the journey/itinerary. At the same time, the tag takes a GPS reading of its initial or starting position (i.e., the specific airline check-in counter at a specific airport) and transmits this data to the tag service provider server. In all these operations, the current time is also recorded on both the server and the tag. The operations are performed essentially after the tag is powered on, the bar code is scanned, and the tag is linked to the passenger itinerary. Once this linking is done, the starting point and current time are recorded.

Once check-in is completed, the tag is powered on, loaded with specific data, and attached to the baggage, the airline agent typically places the baggage on a conveyor belt behind the counter. In another scenario, the passenger may take the baggage to a check point where a TSA official places it in an x-ray unit. At step 404 the baggage and tag are on a conveyor belt and the sensors on the tag detect a certain type of vibration from resting on the belt. The tag also detects continuous movement, assuming the belt is generally moving at all times and at a consistent speed. In the normal course of a journey, the tag will experience different types of vibrations from conveyor belts, trams, carts, and carousels and different types of movement.

At step 406 the baggage, still on the conveyor belt, enters or is exposed to an x-ray machine. Here, one of the sensors on the tag may detect a spike in electro-magnetic energy characteristic of being exposed to x-rays. This spike in e-m energy may or may not be consistent with the journey profile downloaded to the tag. For the purposes of the illustration in FIG. 4, it is assumed that it is. At step 408 the tag has exited the x-ray unit and the level of e-m energy returns to a normal or initial level. The tag continues detecting vibrations from the conveyor belt and continuous movement.

The baggage is now making its way to a holding area or loading dock. At step 410 the baggage is picked up off the conveyor belt and placed in the holding area. As such, the tag senses an abrupt movement (picked up or dropped) and stops sensing the specific vibration from the belt. The baggage may also be still for a moment before it is picked up by a baggage handler and placed in the holding area. In this case, sensors may detect stillness followed by abrupt movement. In either case, these stimuli indicate that the baggage has reached a holding area, essentially the area where baggage waits to be placed on a baggage cart and taken to a plane.

A baggage handler then places the baggage onto a cart that is driven to the baggage loading tram of the plane. At step 412 the tag senses a different type of vibration from the baggage cart. The tag also senses abrupt movements from being picked up and placed on the cart. In many cases the baggage may now be outside and may experience other stimuli, such as changes in temperature, light, and acceleration (from being on the cart which is presumably moving faster than the conveyor belt). Experiencing these particular stimuli tells the tag that it is now most probably on its way to the plane and will be in proximity to the plane shortly.

The baggage is now close to the plane and the cart stops. At step 414, the tag senses an abrupt stop and then waits for the movement that is consistent with movement that indicates that is going into the plane. At this stage, as shown in step 414, the tag takes a GPS reading to get its position data and communicates this data and the current time to the tag service provider server. It also receives any updates to the itinerary from the server, essentially to see if there are any last minute changes to the flight. The server can also use the GPS data of the baggage to determine whether the baggage is about to be loaded onto the right plane. In one embodiment, the tag always turns off a few minutes before the plane is scheduled to depart. Another failsafe to ensure that the tag is not in normal operating mode while in flight includes the tag detecting that there is movement that is consistent with continuous movement of a plane getting ready to take off or simply moving in general. If this is detected, the tag transitions to a deep sleep mode.

At step 416 the tag changes its mode to deep sleep mode or the equivalent. This step is further described in FIG. 5. Previously the tag was in a normal operation mode in which it was able to perform cellular and GPS communications. However, it cannot be in this mode while being conveyed on an airplane, so in line with its self-regulation capabilities, the tag itself knows to enter deep sleep mode where cellular and GPS functions are disabled. In one embodiment, the tag does not receive instructions or indicators from the server to disable or transition to sleep mode.

At step 418, while the baggage is being conveyed on the plane, the tag keeps track of how long it has been on the plane and/or how long the plane has been flying (the tag's clock is always operating when it is powered on). Sensors on the tag detect certain stimuli during flight. These include internal airplane vibrations from being on that specific type or model of plane. After a specific length of time has passed (i.e., the expected duration of the flight indicated in the itinerary as stored on the tag) and the tag detects vibrations consistent with being on a tram (the same type used to load the baggage onto the plane), and vibration profiles consistent with physical handling, the tag thinks it is being unloaded from the plane. At step 420, the tag may transition from sleep mode to normal operating mode. It may wait for a longer time, such as when it detects vibrations from being on a baggage cart (being carted away from the plane to a holding area), to transition to normal operating mode.

At step 422, when the tag is capable of GPS reading and communication with the server, it does precisely that. A GPS reading is taken and transmitted to the tag service provider server. The baggage is then unloaded and held in a holding area or loading dock. The tag detects the same or similar stimuli (abrupt movements, stillness, etc.) as it did when heading toward the plane. At step 424 the baggage is picked up and placed on a conveyor belt from where it is automatically placed on a baggage carousel (going under the assumption that this is a one-leg journey). The tag detects vibrations from the conveyor belt, followed by another type of vibration from the carousel. At step 426 the baggage is picked up by the passenger and, as a result, the tag detects abrupt movement. At this point it may send a message to the server that it thinks it has reached the end of the journey and it takes a GPS reading. The tag may then compare that GPS reading with the GPS position data for the expected baggage carousel (or, more generally, the baggage carousel area) that it has stored in its memory (i.e., that it received at the beginning of the journey). It may then power itself off or the passenger may power it off so that none of its sensors, indicators, communication means, and so on, are operational.

Figure 5:
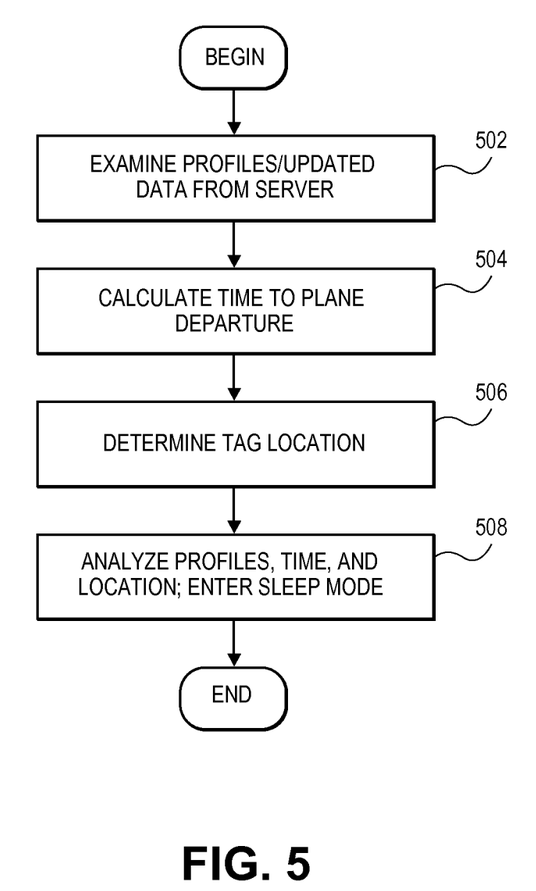
FIG. 5 is a flow diagram of showing steps taken and factors taken into consideration by a tag so that it knows when to go into sleep mode or, more specifically, government regulation-compliant mode in accordance with one embodiment.

FIG. 5 is a flow diagram showing steps and factors taken into consideration by a tag so that it knows when to go into deep sleep mode or, more specifically, "government regulation-compliant" mode in accordance with one embodiment. It is worth noting that in order for the tag to go to "sleep," it does not have to receive any instructions from the server, from another computer or device, or a person. The intelligence it needs to enter this mode is embedded on the tag. The steps shown in FIG. 5 may be performed in a different order than that shown here and other factors, not shown in the flow chart, may also be taken into consideration. In other embodiments, some of the factors shown may not be determined or considered, or may be given varying weight or priority. As such, in one illustrative embodiment, at step 502 the tag examines profiles, such as journey profiles and/or vibration profiles it has received from the server. As described above, it may receive these profiles at the start of the journey. The profiles tell the tag where it should be in the journey based on the itinerary. That is, it tells the tag what type of stimuli it should be experiencing at any given time. The tag may also have received updated data, in most cases this would be itinerary-related data (flight delays, cancellations, gate changes, etc.), but can be other types of data as well.

At step 504 the tag calculates the time left to the currently scheduled plane departure (time to departure). It can do this using its internal clock and the plane departure time from the stored itinerary. In one embodiment, the time to departure plays an important role in determining when the tag goes into sleep mode. At step 506 the tag determines its location by taking a GPS reading. In one embodiment the GPS location of the plane or the gate for loading the plane is stored on the tag. At step 508 all or some of these factors are analyzed and the tag determines whether to go into sleep mode. For example, if the itinerary is up-to-date, the tag can calculate an accurate time-to-departure. In one embodiment, if this time is below a certain threshold, for example, 20 minutes or any appropriate length of time, AND the tag location is near or at the departure gate AND it is experiencing or has recently experienced vibrations from a baggage cart or tram, the tag self-regulates and may transition into sleep mode. Before it does this, it may transmit a GPS reading. In other embodiments, it may only take into consideration time and location. As noted, the number of factors considered may be more or fewer than those shown here and the order in which they are determined or calculated may vary depending on implementation.

Figure 6:
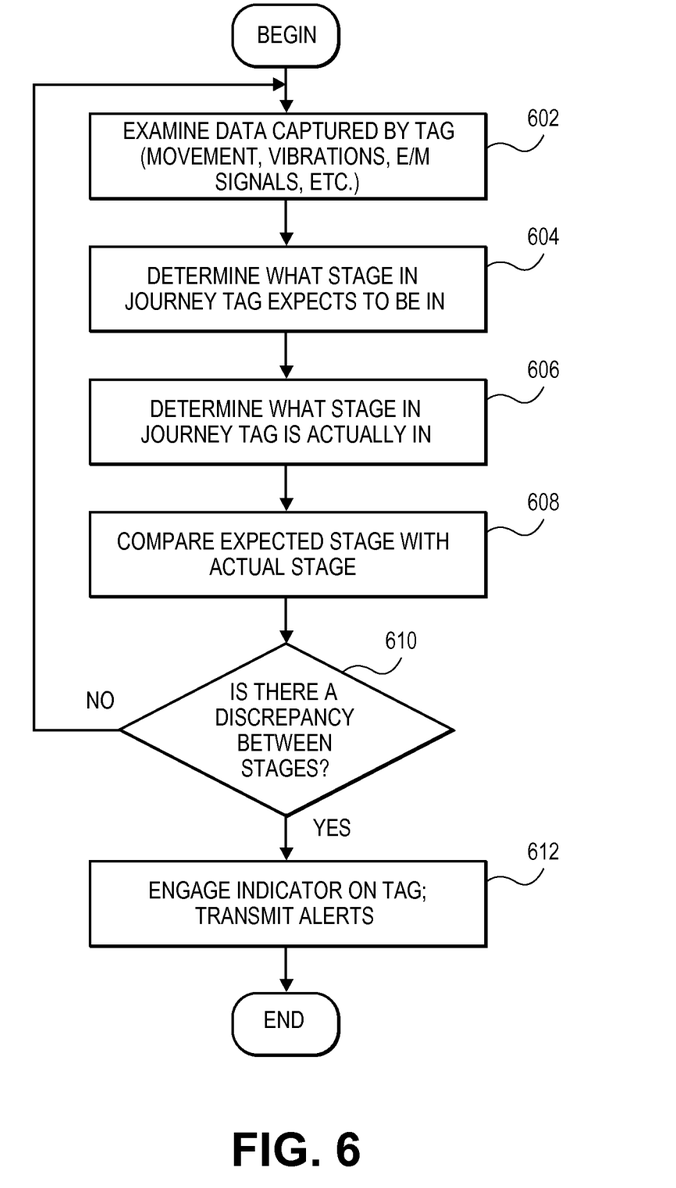
FIG. 6 is a flow diagram of processes taken by a tag of determining a discrepancy in its journey in accordance with one embodiment.

FIG. 6 is a flow diagram of a process taken by a tag of determining a discrepancy in its journey in accordance with one embodiment. As described above, one of the self-regulating features of the tag is that it is self-aware and has intelligence to determine when it is at a location where it should not be according to the up-to-date itinerary and journey profiles stored in its memory. At step 602 the tag examines its sensor data, such as vibrations, movement, electro-magnetic signals, and so on. As an implementation matter, this is being done at nearly all times when the tag is powered on. At step 604 the tag determines what stage in its journey it expects or thinks it should be in. In one embodiment, it does this by examining the itinerary. For example, if the itinerary states that at a certain time, the baggage should be at a baggage carousel, then the tag expects to be in the final stage of its journey. At step 606 the tag determines what stage in the journey it is actually in. It can do this by examining data captured at step 602 from its sensors. A simple example is if the sensor data indicates electro-magnetic signals, then the tag is in an x-ray machine and will likely be loaded onto a plane within x amount of time. It may also take GPS readings if possible and use that data, alone or combined with other sensor data, to determine its actual position.

At step 608 the actual position or stage that the tag is in (step 606) is compared to the expected position or stage of the tag (step 604). The tag expects to be at a certain stage in the journey. This expectation may be derived or be a function of how long before the plane departs. If it is not at a critical point (e.g., too far from the airport and only 30 minutes before departure, or not moving towards the plane with only 10 minutes left before departure) then the tag will communicate this discrepancy to the server or the server may make a decision about the tag based on the data the tag has transmitted and generate a discrepancy. Both the tag and the server can generate a GPS discrepancy based on a tag not being in the perimeter of a GPS waypoint. That is, when a tag comes within a certain number of feet of a known GPS point, the tag will trigger a message to the server that the tag is in that vicinity. At step 610 the tag determines whether there is a discrepancy between the actual stage/position and the expected stage/position. In one embodiment, if the baggage is generally in the same stage of a journey, then there is no discrepancy. If the two are the same, then there is no action to be taken except continuing to examine its sensor data at which point control returns to step 602.

If the stages are not the same, control goes to step 612 where indicators, such as LEDs, audio signals, and the like, are engaged on the tag. This is a visual indicator to anyone physically handling or managing the baggage that it has probably been misrouted. The discrepancy may also trigger transmission of alerts to various entities, such as notations or alerts on that passenger itinerary in an airline baggage management system, SMS, e-mails, or phone calls to the passenger's mobile device, messages to airline personnel, such as to a baggage handler for the airline working in proximity to the misplaced baggage, and so on. The objective with sending the alerts in real time is to give airline personnel sufficient opportunity to address the problem and get the baggage back on the correct path, thereby preventing the passenger having to deal with a lost baggage situation at the end of the journey.

As described above, the tag of the present invention operates on a platform having a server that gathers data from numerous sources both on and off the tag, processes that information in the server and using a microcontroller in the tag, and controlling the tag based on conclusions drawn from data obtained both from local and network resources.

The tag can be used to track and manage any type of item, such as cargo, using the same or similar concepts described above.

Figure 8A:
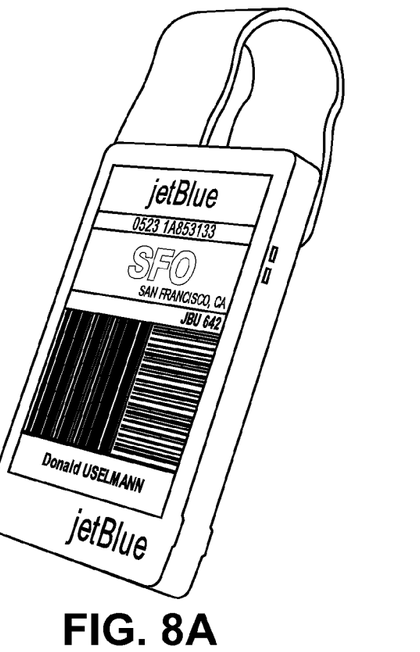
FIGS. 8A, 8B, and 8C are various perspective illustrations of a baggage tag rubber strap in accordance with one embodiment.
Figure 8B:
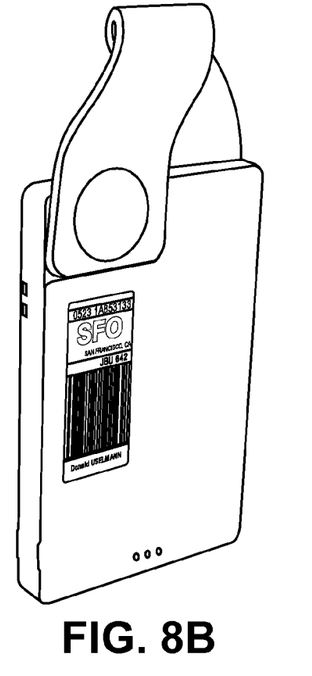
Figure 8C:
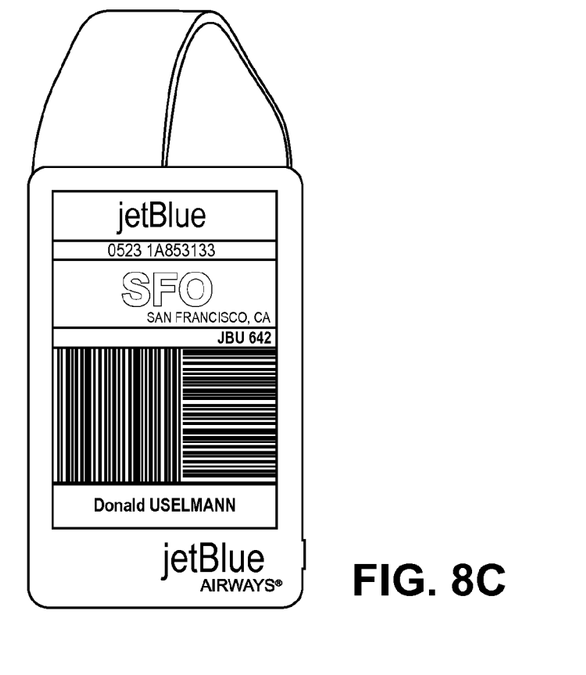

In other embodiments, the tag may be attached to a baggage using a described method. The tag may be attached using a heavy duty rubber strap that is permanently attached to the back of the tag and clicks into a secure receptacle on the front of the strap, on the opposite corner. The rubber strap is shown in FIGS. 8A, 8B, and 8C. An angled front view is shown in FIG. 8A, an angled back view is shown in FIG. 8B, and a full front view is shown in FIG. 8C. The purpose is to enable a user to quickly attach the tag to the bag, while providing a secure means of attachment. It works on the same principle as some of the electronic tags that are attached to clothing in retail stores, to prevent theft. However, it has been modified so that it does not lock and so that a user can remove it without any sort of electronic or mechanical device, in order to make it quick and convenient to remove.

In another embodiment, and as mentioned above, a kiosk can be used by a passenger to provide self-service baggage check-in instead of going to a check-in counter. The intent is to provide an automated delivery system for the tags, but that has the flexibility to deliver conventional paper bag tags as well. Each kiosk may include: a scale for weighing the baggage; a printer for printing conventional paper bag tags; and a mechanical/electronic mechanism for delivering the tags. There may also be software that a. calculates the payment due, based upon weight; b. transmits the weight to the airline operational system for calculating weight and balance loads for the aircraft; c. creates a record for that bag and attaches it to the passenger record in the reservation system; d. sends the updated passenger record to the server, which then: i. Sends the passenger itinerary to the next available electronic baggage tag; ii. Updates the itinerary and the digital itinerary display on the tag; and iii. Delivers the tag to the passenger, who attaches it to their baggage and puts the bag on a conveyor belt.

Figure 9A:
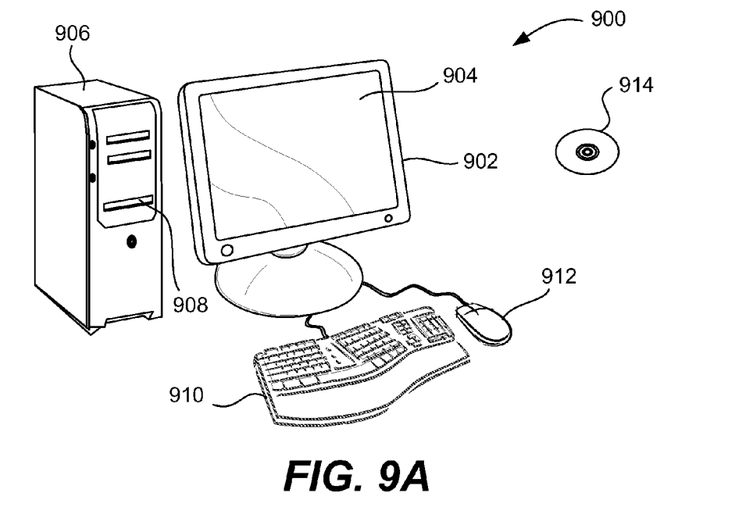
FIGS. 9A and 9B are diagrams of a computing device suitable for implementing embodiments of the present invention.
Figure 9B:
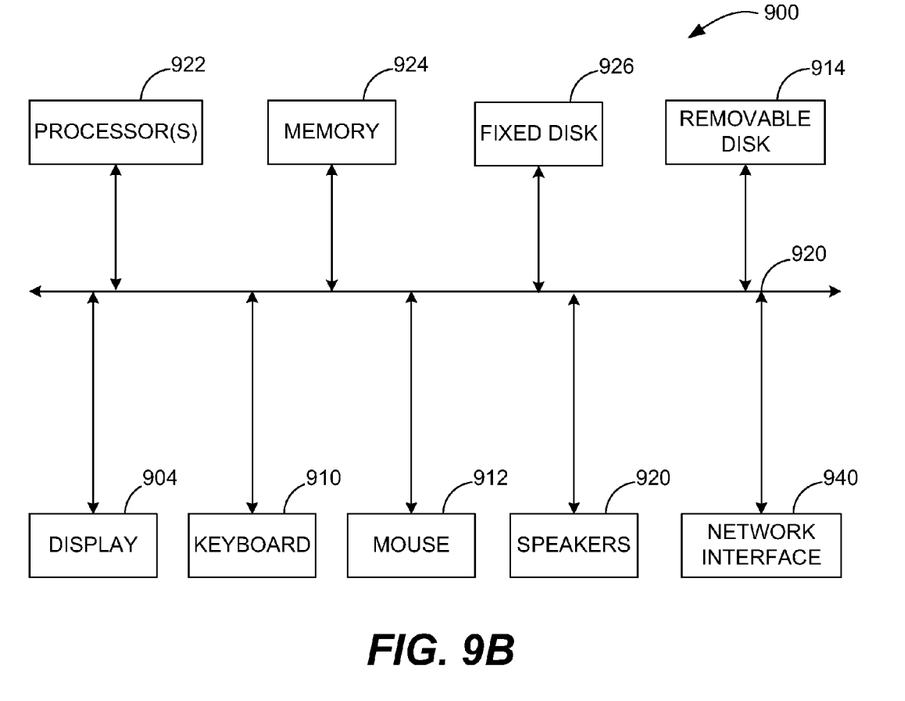

As noted above, the primary computing device in the invention is an electronic tag and a server, but it may be another computing device such as a smart phone, a tablet computer, a mobile device, a PC, and the like. FIGS. 9A and 9B illustrate a generic computing system 900, suitable for implementing specific embodiments of the present invention. Some of the devices that can be used in the present invention may have other features or components that are not shown in FIGS. 9A and 9B and not all the components shown in these figures (e.g., the keyboard) are needed for implementing the present invention. As such, FIG. 9A shows one possible physical implementation of a computing system as this term is broadly defined.

In one embodiment, system 900 includes a display or screen 904. This display may be in the same housing as system 900. It may also have a keyboard 910 that is shown on display 904 (i.e., a virtual keyboard) or may be a physical component that is part of the device housing. It may have various ports such as HDMI or USB ports (not shown). Computer-readable media that may be coupled to device 900 may include USB memory devices and various types of memory chips, sticks, and cards.

FIG. 9B is an example of a block diagram for computing system 900. Attached to system bus 920 is a variety of subsystems. Processor(s) 922 are coupled to storage devices including memory 924. Memory 924 may include random access memory (RAM) and read-only memory (ROM). As is well known in the art, ROM acts to transfer data and instructions uni-directionally to the CPU and RAM are used typically to transfer data and instructions in a bi-directional manner. Both of these types of memories may include any suitable of the computer-readable media described below. A fixed disk 926 is also coupled bi-directionally to processor 922; it provides additional data storage capacity and may also include any of the computer-readable media described below. Fixed disk 926 may be used to store programs, data and the like and is typically a secondary storage medium that is slower than primary storage. It will be appreciated that the information retained within fixed disk 926, may, in appropriate cases, be incorporated in standard fashion as virtual memory in memory 924.

Processor 922 is also coupled to a variety of input/output devices such as display 904 and network interface 940. In general, an input/output device may be any of: video displays, keyboards, microphones, touch-sensitive displays, tablets, styluses, voice or handwriting recognizers, biometrics readers, or other devices. Processor 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon processor 922 or may execute over a network such as the Internet in conjunction with a remote processor that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the embodiments described are illustrative and not restrictive, and the invention is not to be limited to the details given herein, but may be modified within the scope and equivalents of the appended claims.

What we claim is:

1. An electronic baggage tag, the tag comprising: a microcontroller, a memory, a GPS module, a power source, a communications component, and a plurality of sensors, wherein at least one of the plurality of sensors is a vibration sensor; wherein the tag is configured to:
   receive an initial itinerary via the communications component while the tag is in a first mode, the initial itinerary stored in the memory;
   detect stimuli using the plurality of sensors;
   enter a second mode when a first type of sequence of stimuli is detected using the plurality of sensors;
   exit the second mode when a second type of sequence of stimuli is detected using the plurality of sensors;
   download a plurality of vibration profiles from a remote server;
   return to the first mode from the second mode when vibrations are detected that match a specific vibration profile in the plurality of vibration profiles;
   detect vibrations consistent with being on a conveyor belt, or on a baggage cart, or on a baggage carousel;
   wherein the tag does not rely on communications with the remote server during a journey except for receiving updated itinerary data.

2. The device of claim 1, further comprising a radio frequency (RF) transmitter.

3. The device of claim 1, wherein the GPS module further comprises an antenna.

4. The device of claim 1, wherein the power source is a battery.

5. The device of claim 4, wherein the battery is rechargeable.

6. The device of claim 1, wherein the communications component is a cellular communications component.

7. The device of claim 1, wherein the communications component is a network interface.

8. The device of claim 7, wherein the network interface is a wireless network interface.

9. The device of claim 1, wherein at least one of the plurality of sensors is a compass.

10. The device of claim 1, wherein at least one of the plurality of sensors is an altimeter.

11. The device of claim 1, wherein at least one of the plurality of sensors is a movement sensor.

12. The device of claim 11, wherein the movement sensor is an accelerometer.

13. The device of claim 1, wherein at least one of the plurality of sensors is a thermometer.

14. The device of claim 1, wherein at least one of the plurality of sensors is a light sensor.

15. The device of claim 1, wherein at least one of the plurality of sensors is a magnetometer.

16. The device of claim 1, further configured to transmit a discrepancy message if the tag determines that the tag is not in an expected location.

* * * * *